United States Patent [19]

Ikebe et al.

[11] Patent Number: 5,621,597
[45] Date of Patent: Apr. 15, 1997

[54] DISC CARTRIDGE

[75] Inventors: Masaru Ikebe, Saku; Haruo Shiba, Komoro; Shinichi Satoh; Morimasa Sasaki, both of Saku, all of Japan

[73] Assignee: TDK Corporation, Tokyo-to, Japan

[21] Appl. No.: 395,161

[22] Filed: Feb. 27, 1995

Related U.S. Application Data

[63] Continuation of Ser. No. 886,771, May 21, 1992, abandoned.

[30] Foreign Application Priority Data

May 22, 1991 [JP] Japan ................. 3-145184

[51] Int. Cl.$^6$ ................................. G11B 23/03
[52] U.S. Cl. ............................ 360/133; 369/270
[58] Field of Search ............................ 360/98.07, 98.08, 360/99.08, 99.12, 133; 369/264, 270, 271, 290, 291, 292

[56] References Cited

U.S. PATENT DOCUMENTS

| | | | |
|---|---|---|---|
| 4,060,839 | 11/1977 | Meadows | 360/133 |
| 4,149,207 | 4/1979 | Porter, Jr. et al. | 360/99.05 |
| 4,152,740 | 5/1979 | Stratton | 360/133 |
| 4,542,426 | 9/1985 | Wilkinson, Jr. et al. | 360/99.12 |
| 4,686,666 | 8/1987 | Dieffenbach | 369/290 |
| 4,697,216 | 9/1987 | Tsukahara | 360/133 |
| 4,843,512 | 6/1989 | Moore et al. | 360/133 |
| 4,896,232 | 1/1990 | Sugawara | 360/99.08 |
| 5,072,438 | 12/1991 | Suzuki et al. | 369/290 |
| 5,130,870 | 7/1992 | Jabbari | 360/133 |

FOREIGN PATENT DOCUMENTS

| | | | |
|---|---|---|---|
| 169381 | 10/1983 | Japan | 360/133 |
| 634309 | 2/1988 | Japan | |
| 281463 | 11/1990 | Japan | 369/270 |

*Primary Examiner*—Stuart S. Levy
*Assistant Examiner*—George J. Letscher
*Attorney, Agent, or Firm*—Price, Gess & Ubell

[57] ABSTRACT

A disc cartridge capable of permitting a hub to be constantly rotated about the center of rotation thereof without any eccentricity, to thereby ensure smooth and stable rotation of the disc. The hub is formed with three drive shaft inserting holes in a manner to be spaced from each other at equal intervals and positioned on a concentric circle of a predetermined radius defined about a center of rotation of the hub. The drive shaft inserting holes each are formed with a linear driven surface which is adapted to be contacted with a drive shaft inserted into the hole. The driven surface may be arranged at an angle of −30 to +30 degrees with respect to the center of rotation of the hub.

9 Claims, 2 Drawing Sheets

DISC CARTRIDGE

This is a continuation of application Ser. No. 07/886,771, filed on May 21, 1992, now abandoned.

BACKGROUND OF THE INVENTION

1. Field of the Invention

This invention relates to a disc cartridge, and more particularly to a disc cartridge for a hard disc, a floppy disc, a magnetic disc, a magneto-optical disc or the like.

2. Description of Related Art

Conventionally, a disc cartridge such as a floppy disc cartridge, a magneto-optical disc cartridge or the like has been well known in the art. Such a disc cartridge is divided into several types such as an MFD type having a single central shaft and a single drive shaft, a VFD type having a central shaft provided with a spring, an optical disc type having only a central shaft, and the like. These types are common in that a disc is provided at a central portion thereof with a hub which is formed with a drive shaft inserting hole adapted to engaged with a drive unit.

The conventional MFD type disc cartridge includes only one drive shaft; therefore, application of any external force thereto causes a variation of centering force during one revolution of a disc to be increased, so that it is required to manufacture a hub and a driving unit with high dimensional precision, leading to an increase in manufacturing cost. Also, it fails to exhibit satisfactory reliability. Further, it causes centering force to be negative during one revolution of the disc when frictional force is increased due to any change of a medium with time, to thereby generate eccentricity sufficient to cause a failure in modulation, and resulting in deteriorating its value as a commercial product.

The conventional VFD type disc cartridge is so constructed that a hub is formed of a plurality of parts. Such construction causes the cartridge to be complicated in both structure and manufacturing, leading to an increase in cost. Also, in any optical disc type cartridge, only centering between the central shaft and a shaft inserting hole is carried out, so that it is required to manufacture a hub and the shaft with high dimensional precision. This likewise causes manufacturing of the cartridge to be complicated and troublesome sufficient to lead to an increase in cost.

SUMMARY OF THE INVENTION

The present invention has been made in view of the foregoing disadvantages of the prior art.

Accordingly, it is an object of the present invention to provide a disc cartridge which is capable of being manufactured at a reduced cost.

It is another object of the present invention to provide a disc cartridge which is capable of exhibiting satisfactory reliability for its intended use.

It is a further object of the present invention to provide a disc cartridge which is capable of significantly improving workability.

It is still another object of the present invention to provide a disc cartridge which is capable of facilitating centering of a disc while effectively preventing eccentricity of the disc that is apt to occur during revolution of the disc, to thereby ensure smooth and stable rotation of the disc.

In accordance with the present invention, a disc cartridge is provided. The disc cartridge includes a casing formed with a pickup inserting window, a disc provided at a central portion thereof with a hub and rotatably received in the casing and a shutter arranged so as to open and close the pickup inserting window of the casing. The hub is formed with three or more drive shaft inserting holes in a manner to be spaced from each other at suitable intervals and positioned at locations apart by a predetermined distance from a center of rotation of the hub. The drive shaft inserting holes each have a driven surface linearly formed which is adapted to be contacted with a drive shaft inserted into each of the drive shaft inserting holes.

In a preferred embodiment of the present invention, the drive shaft inserting holes are positioned at equal intervals.

In a preferred embodiment of the present invention, three such drive shaft inserting holes are arranged.

In a preferred embodiment of the present invention, the drive shaft inserting holes each are formed into a substantially semi-circular shape.

In a preferred embodiment of the present invention, the drive shaft inserting holes are positioned on a concentric circle of a predetermined radius defined about the center of rotation of the hub.

In a preferred embodiment of the present invention, the driven surfaces each are arranged at an angle of −30 to +30 degrees with respect to said center of rotation of the hub.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference numerals designate like or corresponding parts throughout; wherein.

DETAILED DESCRIPTION OF THE PREFERRED EMBODIMENT

Now, a disc cartridge according to the present invention will be described hereinafter with, reference to the accompanying drawings.

The following description will be made in connection with a floppy disc cartridge. However, it is a matter of course that the present invention is not limited to a floppy disc cartridge.

Figure 1:
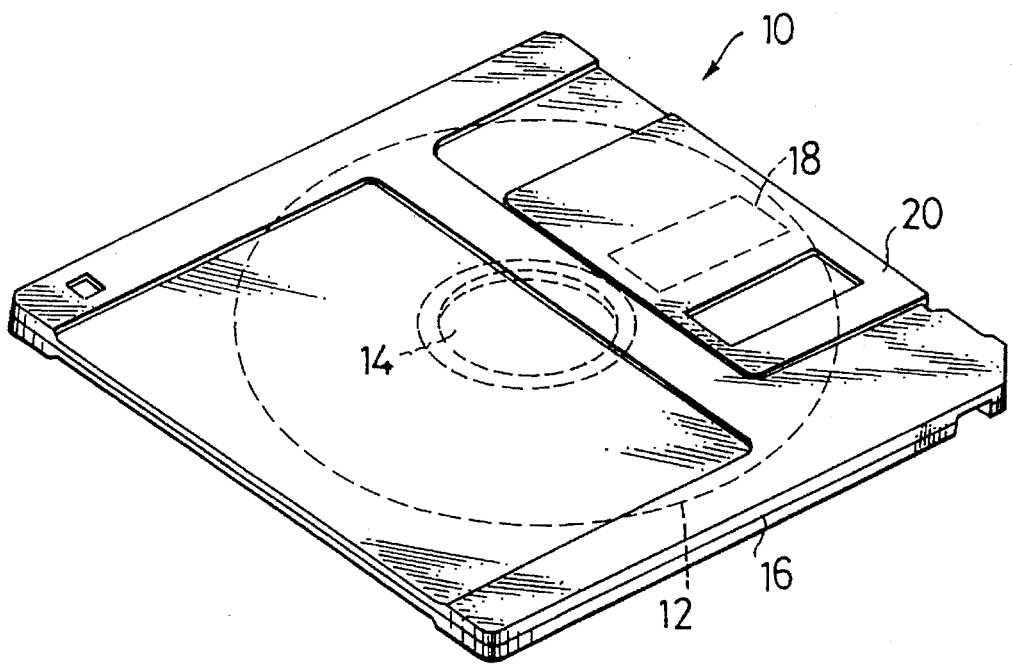
FIG. 1 is a perspective view showing an embodiment of a disc cartridge according to the present invention.
Figure 2:
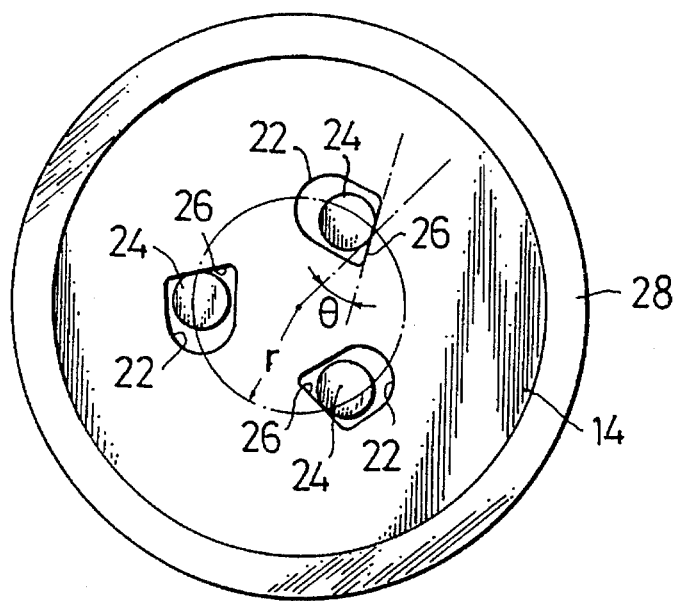
FIG. 2 is a plan view showing a hub in the disc cartridge of FIG. 1.
Figure 3:
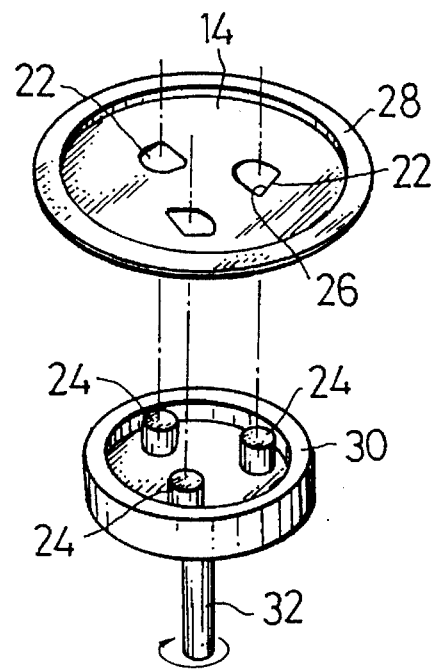
FIG. 3 is an exploded perspective view showing a relationship between a hub and a drive shaft in the disc cartridge of FIG. 1.
Figure 4:
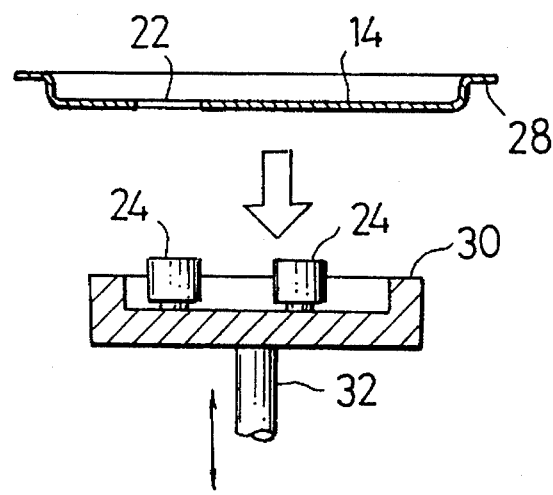
FIG. 4 is an enlarged exploded vertical sectional view of the hub and drive shaft shown in FIG. 3.

Referring now to FIGS. 1 to 4, an embodiment of a disc cartridge according to the present invention is illustrated which is in the form of a floppy disc cartridge. A disc cartridge of the illustrated embodiment which is generally designated by reference numeral 10 includes a disc 12 which is provided at a central portion thereof with a hub 14. The disc cartridge 10 also includes a casing 16 for rotatably receiving the disc 12 therein. The casing 16 is formed with a window 18 through which a pickup (not shown) is inserted into the disc cartridge 10. In addition, the disc cartridge 10 of the illustrated embodiment includes a shutter 20 slidably mounted on the casing 16 so as to open and close the window 18.

In the disc cartridge 10 generally constructed as described above, the hub 14 is formed with three or more drive shaft inserting holes 22 in a manner to be spaced from each other at suitable intervals and positioned at locations apart by a predetermined distance from a center of rotation of the hub 14, into which a plurality of drive shafts 24 are inserted, respectively. The drive shaft inserting holes 22 each are formed with a driven surface 26 which is adapted to be contacted with the drive shaft 24 inserted into the hole 22. The driven surface 26 is defined to be linear. More specifically, the driven surface 26 may be arranged in a manner to be linear at an angle θ of −30 to +30 degrees with respect to the center of rotation of the hub 14, resulting in the driven surface 26 acting as a drive shaft receiving surface.

In the illustrated embodiment, the drive shaft inserting holes 22 each are formed into a substantially semi-circular shape so that the drive shaft receiving surface is linearly shaped. Also, in the illustrated embodiment, three such holes 22 are arranged at equal intervals on a concentric circle of a predetermined radius r defined about the center of rotation of the hub 14. However, it is a matter of course that four or more such holes 22 may be provided.

The construction of the hub 14 described above permits each of the drive shafts 24 to be equally contacted with the driven surface 26 of the corresponding hole 22 when the hub 14 is not rendered eccentric. Whereas, when the hub 14 is rendered eccentric, it permits any adjacent two of the drive shafts to be contacted with the driven surfaces 26 of the corresponding holes 22, respectively, so that resultant force of driving torque in a direction opposite to a direction in which the hub 14 is rendered eccentric occurs, which resultant force then functions to correct any eccentricity of the hub 14.

In the illustrated embodiment, the driven surfaces 26 each are inclined at an angle θ. The angle θ may be set to be zero or negative so long as the driven surface 26 is a straight surface with which the drive shaft 24 is contacted.

The hub 14 may be formed into a dish-like shape having a flange 28 provided on an outer periphery thereof and is mounted at a bottom lower surface thereof on a datum surface 30 of a spindle 32, resulting in being fitted in a central hole of the disc 14.

In the disc cartridge of the illustrated embodiment constructed as described above, the drive shafts 24 of a disc cartridge drive unit are engagedly fitted in the drive shaft inserting holes 22 of the hub 14 and then rotated. When the hub 14 is rendered eccentric, the driven surfaces 26 of any adjacent two of the drive shaft inserting holes 22 are caused to be abutted against the corresponding drive shafts 24, so that force may be generated in a direction opposite to a direction of eccentricity of the hub 14 to carry out centering of the hub 14. This results in the hub 14 being constantly rotated about the center of rotation thereof without any eccentricity.

As can be seen from the foregoing, the disc cartridge of the present invention is so constructed that the hub is formed with three or more drive shaft inserting holes in a manner to be spaced from each other at suitable intervals and positioned at locations apart by a predetermined distance from the center of rotation of the hub, the drive shaft inserting holes each are formed with the driven surface contacted with the drive shaft inserted into each of the drive shaft inserting holes, and the driven surface of each of the drive shaft inserting holes is linearly formed. Such construction permits the hub to be constantly rotated about the center of rotation thereof without any eccentricity, to thereby prevent a failure in modulation. Also, it permits a disc cartridge to be manufactured at a reduced cost and with reduced dimensional precision and exhibit satisfactory reliability. Further, the disc cartridge of the present invention significantly improves workability and facilitates centering of the disc while effectively preventing eccentricity apt to occur during revolution of the disc, to thereby ensure smooth and stable rotation of the disc.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. In a combination disc cartridge with a casing member and drive unit having a rotatable drive member with at least three spaced drive shafts cantilevered from one end and simultaneously inserted into the disc cartridge, the improvement comprising:

a disc rotatably provided in said casing member with a central portion provided with a solid hub, said hub being formed with three or more drive shaft inserting holes positioned on a solid hub surface and spaced from each other at suitable intervals and positioned at locations arranged at predetermined distances from a center of rotation of said hub and each other, the center of rotation of said hub comprising a solid non-apertured surface, said drive shaft inserting holes each having a driven surface linearly formed which is contacted with each respective drive shaft which has been inserted into each of said drive shaft inserting holes, each of the driven surfaces being non-radially aligned with said center of rotation in such a manner to cause said disc to self-center itself about said center of rotation during rotation.

2. The invention defined in claim 1, wherein said drive shaft inserting holes are formed into a substantially semi-circular shape.

3. The invention defined in claim 1, wherein said drive shaft inserting holes are positioned on a concentric circle of a predetermined radius defined about said center of rotation of said hub.

4. The invention defined in claim 1, wherein said driven surfaces are each arranged at an angle of −30 to +30 degrees with respect to radius from said center of rotation of said hub to a point of contact with the driven surface.

5. The invention defined in claim 4, wherein said rotatable drive member includes a cylindrical cavity with an annular flange for receiving the hub, the drive member extending from and terminating above the cylindrical cavity.

6. In a combination disc cartridge with a casing member and drive unit, the improvement comprising:

a rotatable drive member with at least three spaced drive shafts which are non-movably cantilevered from one end for simultaneously engaging said disc cartridge, said spaced drive shafts being concentrically spaced to extend from a solid surface;

an annular datum surface extending from said solid surface end and surrounding said three spaced drive shafts; and a disc rotatably provided in said casing member with a central portion provided with a solid hub, said hub being formed with three or more drive shaft inserting holes positioned on a solid hub surface and spaced from each other at suitable intervals and positioned at locations arranged at predetermined distances from a center of rotation of said hub and each other, the center of rotation of said hub comprising a solid non-apertured surface, said drive shaft inserting holes each having a driven surface linearly formed which is contacted with each respective drive shaft, when simultaneously inserted into each of said drive shaft inserting holes, each of the driven surfaces being non-radially aligned with said center of rotation in such a manner to cause said disc to self-center itself about said center of rotation during rotation, each drive surface being positioned at the same angle relative to respective planes extending radially from the center of rotation.

7. In a combination disc cartridge with a casing member and drive unit having a rotatable drive member with at least three spaced drive shafts cantilevered from one end and simultaneously inserted into the disc cartridge, the improvement comprising:

a disc rotatably provided in said casing member with a central portion provided with a solid hub, said hub being formed with three or more drive shaft inserting holes positioned on a solid hub surface and extending transverse to the hub surface, wherein each hole has a non-circular edge on the hub surface which extends transverse to the hub surface and said holes are spaced from each other at locations arranged at predetermined distances from a center of rotation of said hub and each other, the center of rotation of said hub comprising a solid non-apertured surface, said drive shaft inserting holes each having a driven surface linearly formed on a portion of its edge which is contacted with a respective drive shaft which has been inserted into each of said drive shaft inserting holes, each of the linearly driven edge surfaces being non-radially aligned with said center of rotation in such a manner to cause said disc to self-center itself about said center of rotation during rotation when the drive shaft contacts the linear edge surface and the rotation of the disc forces the linear edge surface against the drive shaft, each drive surface being positioned at the same angle relative to respective planes extending radially from the center of rotation.

8. The invention of claim 7 wherein the control portion with a solid hub has a disc-like shape with a flange provided on an outer periphery of the hub for connection to the disc, the solid hub being positioned below and parallel to a plane containing an upper surface of the flange, the drive member and drive shafts contacting only the solid hub and the drive shaft inserting holes, and each of the linear-driven edge surfaces being positioned at the same offset angle relative to respective planes extending radially from said center of rotation to facilitate an easy alignment.

9. In a combination disc cartridge with a casing member and drive unit having a rotatable drive member with at least three spaced drive shafts cantilevered from one end and simultaneously inserted into the disc cartridge, the improvement comprising:

a disc rotatably provided in said casing member with a central portion provided with a solid hub;

said hub being formed with three or more drive shaft inserting holes positioned on a solid hub surface and spaced from each other at suitable intervals and positioned at locations on a concentric circle of a predetermined radius defined about a center of rotation of said hub, said hub having a center portion comprising a solid nonapertured surface;

said drive shaft inserting holes each having a linearly formed driven surface which is contacted with a respective one of said drive shafts which has been inserted into a corresponding one of said drive shaft inserting holes, each of said driven surface being nonradially aligned with said center of rotation, whereby, when said hub is eccentric, the driven surfaces of two adjacent drive shaft inserting holes will be abrated against the respective drive shafts so as to generate a force in a direction opposite to a direction of eccentricity of said hub, each drive surface being positioned at the same angle relative to respective planes extending radially from the center of rotation.

* * * * *